Figure 1:
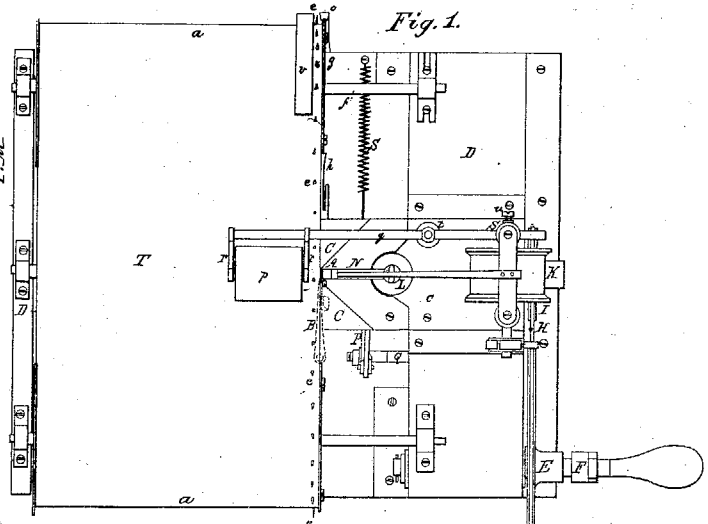

J. Bachelder,
Sewing Machine.

No. 1,543. Reissued Sept. 22. 1863.

Witnesses.
George Henderson
A. C. Tonner

Inventor.
John Bachelder

J. Bachelder,
Sewing Machine.

No. 1,543. Reissued Sep. 22. 1863.

UNITED STATES PATENT OFFICE.

JOHN BACHELDER, OF LISBON, CONNECTICUT.

IMPROVEMENT IN SEWING-MACHINES.

Specification forming part of Letters Patent No. 6,439, dated May 8, 1849; extended May 8, 1863; Reissue No. 1,543, dated September 22, 1863.

*To all whom it may concern:*

Be it known that I, JOHN BACHELDER, of Lisbon, in the State of Connecticut, (formerly of Boston, in the State of Massachusetts, have invented certain new and useful Improvements in Sewing-Machines; and I hereby declare that the following is a full, clear, and exact description thereof, reference being had to the accompanying drawings, making part of this specification.

In sewing-machines operating with an eye-pointed needle and sewing with a continuous thread or threads, known to me prior to my invention, two important wants existed which operated as serious limitations to their usefulness and prevented their adoption to the extent their other merits demanded.

First. In such prior machines the material was hung up or suspended vertically upon points projecting from a plate technically called a "baster-plate," or in clamps, the body of this material hanging below and from such plate or clamps during the operation of forming a seam or while being carried past the needle. This method of holding and feeding was not well adapted for crooked or irregularly-curved seams, and did not allow the operator conveniently to examine or inspect the stitches while the seam was being made, nor did it leave the material free to be directed by the operator conveniently during its passage to the needle while the machine was in operation, but was applicable only to such seams and parts of garments as could be thus adjusted upon and suspended from the baster-plate or in clamps, and required so much time and labor in adjusting even such seams to the plate or clamps that it was of limited utility in the branches of manufacture to which the sewing-machine was otherwise applicable, or for domestic use.

Second. In such prior machines the material or garment, after being fed past the needle and sewed, was left fastened upon and suspended from the baster-plate or clamps, and had to be released and taken off these by hand before another portion of the material or garment could be adjusted thereon preparatory to being sewed. No sewing-machine prior to my invention was capable of sewing a continuous seam of indefinite length during its progressive action and discharging automatically its own work, so that piece after piece or any length of seam desired could be fed through, sewed, and discharged automatically without stopping the machine.

It is the object of my invention to supply to the sewing-machine these two wants by a mechanism for holding and feeding the material past the needle horizontally instead of vertically, and passing or discharging it, when sewed, automatically from the machine during its continuous action, instead of removing it by hand, the operator inspecting, guiding, and giving direction to the seam during the continuous action of the machine. My invention is to be found, therefore, in the mechanism for supporting the cloth, moving it under the needle with a regular intermittent motion, and discharging it automatically from the machine, and in the combination of this mechanism with the sewing mechanism and other essential parts of the sewing-machine.

The leading parts of this mechanism are:

First. A device which advances the material regularly and horizontally by an intermittent motion over and upon the horizontally-supporting surface through which the needle acts and discharges or delivers it automatically to or upon a receiving and supporting or discharging plate. This advancing device is hereinafter termed a "continuous-discharging feed."

Second. A holding-surface upon which the material immediately about the needle rests and is borne up horizontally under the thrust of the needle.

Third. A receiving and supporting or discharging plate so arranged with reference to the feed as to receive and support the material in its passage from the feed, and thus insure the free discharge of the material during the action of the machine.

Fourth. A yielding pressure-holder which rests upon the upper surface of the material near the needle.

For greater clearness and certainty I will here state the functions and mode of operation of each of these parts.

The device termed the "continuous-discharging feed" takes hold of and moves forward the material horizontally and regularly by an intermittent motion upon and over the horizontally holding surface through which the needle acts, and under the yielding-pressure holder, and discharges it automatically upon the receiving and supporting or discharging plate which is placed behind the feed to receive it, taking hold of a fresh portion of the material and discharging an equal portion at each stitch. This feed thus takes hold of the material, moves it forward over the horizontally-holding surface, and discharges it continuously upon the receiving and supporting or discharging plate, so that any length of seam desired may be fed through and discharged during the continuous action of the machine. The feed takes hold of the material by means of points of suitable length inserted in or made to project from its surface, and the friction or grip between the yielding-pressure holder and the feeding-surface. The shape or particular construction of this feed I do not deem material, so long as it operates to take hold of, move forward, and discharge the material continuously in the manner here described.

Although I have used an endless apron furnished with points as my continuous-discharging feed, I do not intend to limit myself to the use of such an apron, as a revolving circular table or a cylinder may be substituted therefor, the points being inserted in or made to project from the curved surface of either of them.

The horizontally-holding surface upon which the material immediately about the needle is supported is so constructed and arranged with reference to the feed and needle that it performs the office of supporting horizontally each portion of the material successively in the line of the seam against the thrust of the needle firmly in its normal and undisturbed condition, so that the stitches, when set, shall be regular and uniform. Each portion of the material in which stitches are to be set throughout the line of the seam is moved by the feed stitch by stitch horizontally under the needle and over and upon this horizontally-holding surface, where it rests and is held during the passage of the needle or while the stitch is being made.

The receiving and supporting or discharging plate is so constructed and arranged with reference to the feed that it performs the office of receiving the material from the feed and from the points and supporting it in its passage from the machine, and thus insuring the free discharge and passage of the material from the machine during its operation in sewing a seam. The form and size of this receiving and supporting or discharging plate are immaterial so long as it retains and performs its functions herein described.

The yielding-pressure holder rests upon the upper surface of the material, near the needle, and holds it by a yielding pressure to the bed upon which it rests and to the feed. This holder is so hung or mounted that it may be readily raised to place the material in or remove it from the machine, and it will rise and fall during the operation of the machine, so as to accommodate itself to the varying thicknesses and inequalities of the material or garment being sewed, while it maintains a constant and uniform pressure upon the material throughout the whole length of the same. This holding and feeding mechanism I believe to be new. It holds and feeds the material upon a supporting bed or surface, on which it rests of its own gravity, under convenient inspection, direction, and control of the operator, and thus saves the time and labor heretofore required in supporting or hanging up the material upon the points of a baster-plate or in clamps. It also holds and feeds the material, so that seams of indefinite length may be made and piece after piece be sewed during the continuous action of the machine, and thus saves the time and trouble heretofore required in detaching the material from the feed by hand after it was sewed.

The sewing mechanism with which I have combined my improvements in my machine herein represented is the same employed in the machine said to have been invented by Charles Morey and Joseph B. Johnson. It is one of the well-known sewing mechanisms to which my improvements are applicable or with which they may be used.

The mechanism by which the stitches are made forms of itself no part of my invention, and any other sewing mechanism can be employed, instead of the one employed by me, which parties employing my invention may prefer, so long as said sewing mechanism makes the stitches in proper time and order, in combination with my improvements.

The reciprocating eye-pointed needle employed by me is well known in its functions and mode of operation, which are essentially the same in my machine as in other sewing-machines.

I have employed other parts—such as a stripping-plate or surface—to strip the material off the needle as the needle rises, a bobbin on which the thread is wound, a tension-spring for making tension upon the thread, &c.; but to these I make no claim. The functions and mode of operation of these severally in my machine are substantially the same as in the Morey & Johnson machine.

The stripping-plate is not essential, and may be used or not, as convenience requires.

The drawings connected herewith exhibit the manner in which I have embodied my improvements in my machine.

Figure 2:
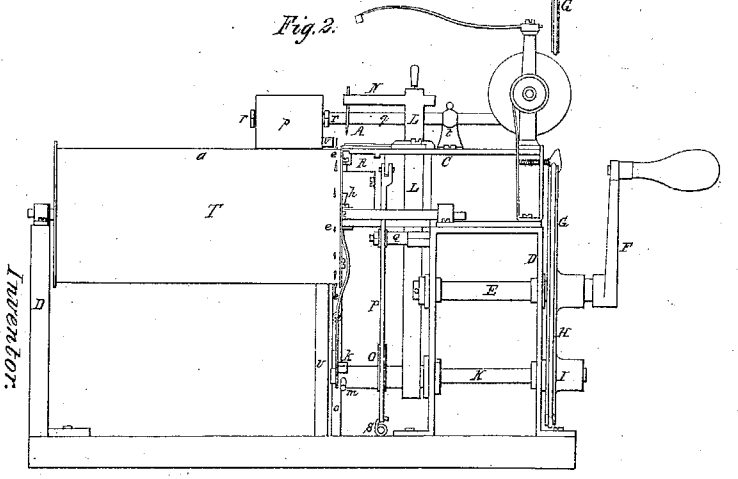
Figure 3:
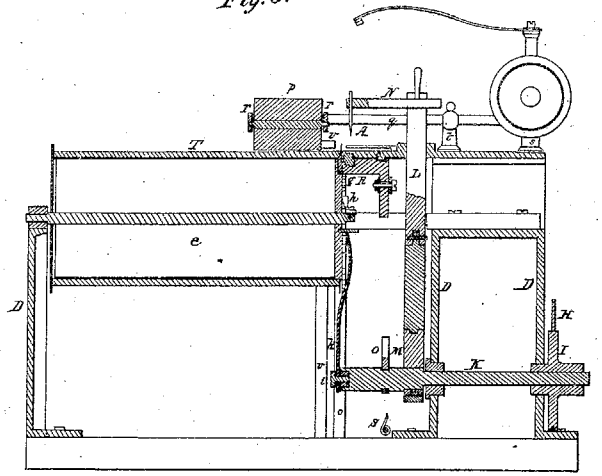
Figure 4:
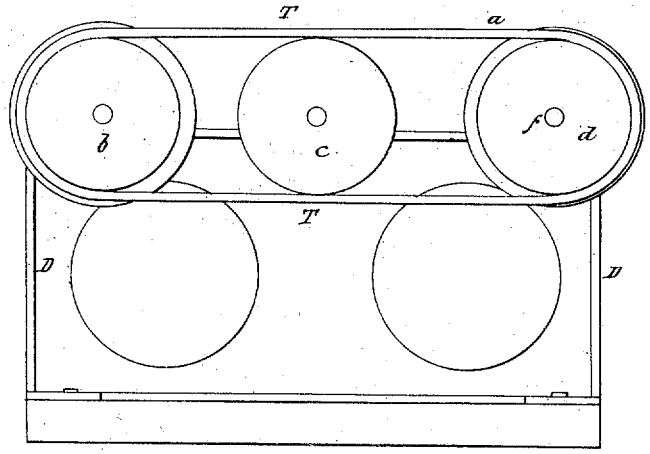
Figure 5:
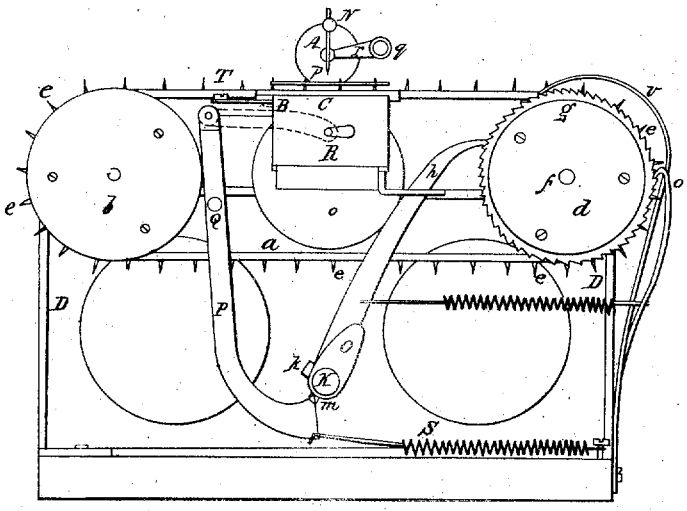

Figure 1 is a top view of my machine. Fig. 2 is a front elevation of it. Fig. 3 is a vertical central and horizontal section of it. Fig. 4 is a transverse vertical section taken through the middle of the continuous-feeding belt. Fig. 5 is a vertical and transverse section of the machine, the same being taken through the cam which effects the retraction of the stitch-hook, the spectator looking toward the belt.

In said drawings, A is the reciprocating eye-pointed needle; B, the hook, (see the red lines in Fig. 1;) C, the holding-surface which supports the material under the thrust of the needle, and D is the frame-work of the machine. This needle moves in a vertical plane, and descends at each stitch from above the holding-surface, carrying in its eye a loop of thread through the material and through the opening provided in the holding-surface and below such holding-surface. This needle A is attached by a bracket, N, to a rod, L, jointed at or near its center, and forced to move up and down by an eccentric, M, mounted on a shaft, K, which is, by the aid of a belt, H, and pulleys I G, caused to revolve when the crank F on the shaft E is turned. The rod has proper guides to insure the vertical motion of its upper part. The hook, which seizes, detains, and releases loops of the thread and operates substantially as Morey and Johnson's hook when aided by similar accessories, is represented at B as mounted on a sliding carriage, R, supported by proper ways or guides, which carriage is reciprocated by a connection with the upper end of a lever, P, pivoted at Q and actuated by a cam, O, and spring S.

Other parts—such as stripping-plate, bobbin, tension-spring, &c.—are represented in the drawings, which are, except in position, substantially the same as in the Morey & Johnson machine, and are no part of my invention.

Figure 6:
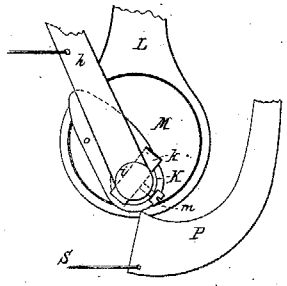
Figure 7:
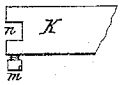

The continuous-discharging feed is seen at T. It consists of a belt of leather, *a a*, supported by and running around three or any other suitable number of cylinders, *b c d*, and having a series of points, *e e e*, fixed in and projecting from its upper surface, near the needle, at such distances apart as occasion may require. This belt moves intermittently after each withdrawal of the needle through just the distance necessary to space the next stitch, which movement is produced as follows: One of the cylinders, *d*, mounted on a shaft, *f*, has secured to it a ratchet-wheel, *g*, which is actuated by a pawl, *h*, driven by a crank-pin, *i*, mounted on a slide, *k*, which can be moved in a slot, *n*, on the end of the shaft K, and secured in any required position by a screw, *m*. (See Figs. 6 and 7.) By moving the slide the throw of the crank is varied, and this varies the length of the travel of the pawl, and consequently the distance through which the belt moves between each puncture of the needle, thus altering the length of the stitch. A holding spring-pawl, *o*, prevents the cylinder from moving in the wrong direction, and one of the cylinder-shafts may rest in adjustable boxes, so that it can be moved to tighten the belt. The yielding-pressure holder *p* lies upon the surface of this feed or belt. It is a roller, which is heavy, free to revolve, and is so hung by links *r r* that it will approach to and recede from the belt, so as to accommodate itself to the varying thicknesses of the material and maintain a constant and uniform pressure thereon throughout the whole length of the seam. The links are pivoted upon a shaft, *q*, supported on standards *s t*, one of which is provided with a clamp-screw, *u*.

*v* is the receiving and supporting or discharging plate, and may be of such width and size as occasion may require. It is disposed in reference to the belt as seen in the drawings. One end of this plate *v* is brought in close contact with the surface of the feed in such manner as to cause the material, when it is carried to it by the feed, to be delivered or discharged upon and over said plate and from the points and feed. The upper surface of the belt *a a*, the holding-surface C, and the receiving and supporting or discharging plate *v* constitute together a supporting-bed, upon which the material rests while passing through the machine and being discharged therefrom.

In the operation of the machine the material or garment is laid upon the parts T and C, the portion where the stitch is being made resting smoothly upon the horizontally-holding surface over the opening for the passage of the needle, the portion beyond where the stitch is being made, if any, lying upon the belt and bed past the needle and upon or toward the receiving and supporting or discharging plate, and the remainder lying in front of the needle upon the belt and bed. The yielding-pressure holder or roll is laid upon the material or garment, holding it down to the feed and upon the points. The hands of the operator rest upon the material or garment before the needle, directing it in its passage to the needle. By observing the operation it will be seen that the feed moves the material or garment in the line of the seam regularly and intermittently, stitch by stitch, horizontally over and upon the holding-surface, and delivers or discharges it to or upon the receiving and supporting or discharging plate, taking hold of a fresh portion and feeding and discharging an equal portion at each stitch automatically; that the holding-surface holds or bears up each successive portion of the material throughout the length of the seam firmly in its normal or undistorted condition against the thrust of the needle as the same is moved over it by the feed; that the receiving and supporting or discharging plate receives the material from the feed and supports it when discharged, preventing it from being again entangled with the points of the feed and insuring its free discharge during the operation of the machine as fast as sewed; that the yielding-pressure holder lies upon the upper surface of the material, near the needle, and maintains a constant and uniform yielding pressure thereon throughout the whole length of the seam, holding it to the bed on which it rests and to the feed, and rising and falling to accommodate itself to all the cross-seams, inequalities, and varying thicknesses of the material; that the material rests, during its entire passage through the machine, and discharge therefrom, of its own weight upon a supporting-bed, as cloth rests on a table, under the control and convenient inspection of the operator; and that seams of indefinite length, or piece after piece, can be fed through, sewed, and discharged automatically during the continuous, uninterrupted, progressive action of the machine.

Having thus described my improvement, I state my claims as follows:

1. In combination, the holding-surface which supports the material immediately about the needle horizontally under the thrust of the needle, and the continuous-discharging feed which moves the material horizontally under and past the needle upon and over such holding-surface, each having the functions and mode of operation hereinbefore specified.

2. In combination, the holding-surface which supports the material immediately about the needle horizontally under the thrust of the needle, the continuous-discharging feed which moves the material horizontally under and past the needle upon and over such holding-surface, and the receiving and supporting or discharging plate, which receives the material from the feed and insures its free passage from the feed and machine during the operation of the machine in sewing a seam, each having the functions and mode of operation hereinbefore specified.

3. In combination, the horizontally-holding surface immediately about the needle, the continuous-discharging feed, the receiving and supporting or discharging plate, and the yielding-pressure holder, each having the functions and mode of operation hereinbefore specified.

4. In combination, the horizontally-holding surface immediately about the needle, the continuous-discharging feed, and the yielding-pressure holder, each having the functions and mode of operation hereinbefore specified.

5. In combination, the horizontally-holding surface immediately about the needle, the continuous-discharging feed, the yielding-pressure holder, and a sewing mechanism, each having the functions and mode of operation hereinbefore specified.

6. In combination, the horizontally-holding surface immediately about the needle, the continuous-discharging feed, the yielding-pressure holder, and the reciprocating eye-pointed needle, each having the functions and mode of operation hereinbefore specified.

7. In combination, the receiving and supporting or discharging plate and the continuous-discharging feed, each having the functions and mode of operation hereinbefore specified.

8. In combination, the horizontally-holding surface immediately about the needle, the continuous-discharging feed, and the reciprocating eye-pointed needle, each having the functions and mode of operation hereinbefore specified.

9. In combination, the continuous-discharging feed, the receiving and supporting or discharging plate, and the yielding pressure holder, each having the functions and mode of operation hereinbefore specified.

JOHN BACHELDER.

Witnesses:
M. M. LIVINGSTON,
M. S. PARTRIDGE.